April 19, 1966  G. L. BURGHART  3,246,918
CLEAT MATERIALS
Filed Sept. 6, 1963
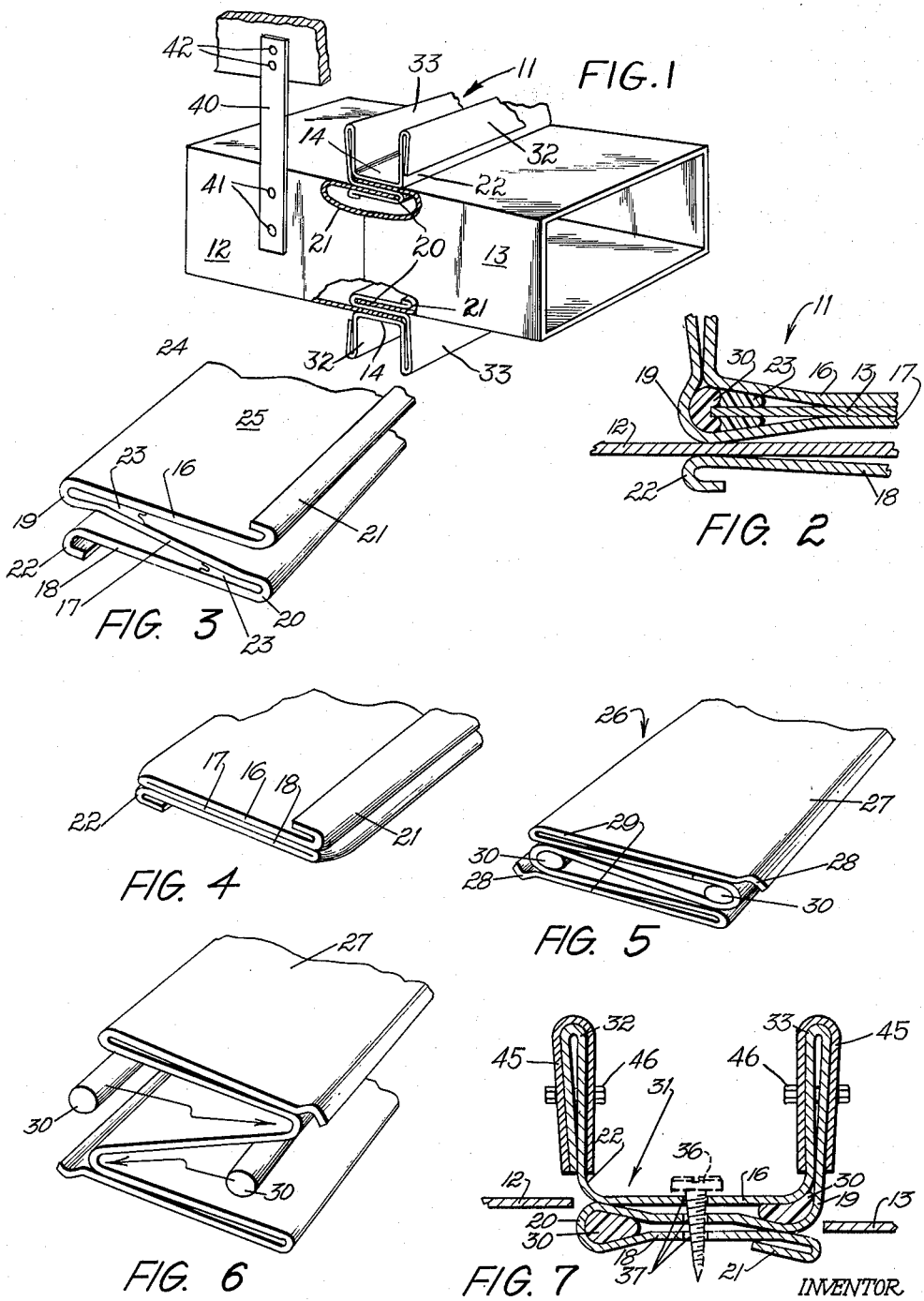
INVENTOR.
GEORGE L. BURGHART
BY Hofgren, Wegner,
Allen, Stellman & McCord
ATTORNEYS

United States Patent Office 3,246,918
Patented Apr. 19, 1966

3,246,918
CLEAT MATERIALS
George L. Burghart, 2347 W. Harrison St., Chicago, Ill.
Filed Sept. 6, 1963, Ser. No. 307,109
5 Claims. (Cl. 285—64)

Reference is made to my copending application Ser. No. 213,330, filed July 30, 1962, now abandoned, entitled "Improved Cleat" and of which this application is a continuation-in-part.

This invention relates to cleat materials and cleats usable for joining sections of duct work and more specifically relates to such cleats and cleat materials useful for providing air-tight joints between duct work sections.

A variety of cleats have been found useful in the past for joining together sections of duct work in heating and other air conditioning systems. However, it has been found that often such cleats do not provide an air-tight joint. Additionally, methods of manufacture of cleats for use in forming sealed joints have often been expensive with respect to the number of steps involved and also with respect to the materials used.

It is a general object of this invention to provide a new and useful cleat member.

It is a further object of this invention to provide a new and improved cleat which may be formed from cleat stock by a technique or method proposed herein.

It is another object of this invention to provide a new and useful cleat which may be readily assembled with air ducts for providing an air-tight seal, the cleat being adaptable for use under high and/or low pressure applications.

Yet another object of this invention is to provide such a cleat or cleat material wherein a seal may be effected by means of a resilient mass contained within the cleat for contacting the cleat with duct work edges.

It is a feature of this invention that such a cleat may be provided which includes a structural member formed in a plurality of sections with angular interconnections therebetween with an elastomeric material on the member between facially opposing portions adjacent the interconnections so that the structural member may be opened along the interconnections for insertion of sheet duct work between facially opposing portions of the cleat and may be closed upon the duct work to compress the cleat and elastomeric material on the duct work for forming an airtight joint. Another feature is in the reversibility of the cleat as a supporting member on either top or bottom overlapping edges of ducts.

It is a more particular feature of this invention that the elastomeric material may be in the form of a mastic and/or a gasket, rendering the cleat adaptable for use under either high or low pressure applications in formation of airtight joints.

Other objects and other features of the invention will be apparent to those in the art from the following descriptions and drawings in which:

FIGURE 1 is a perspective view of two air duct sections joined by a form of the cleat of this invention;

FIGURE 2 is an enlarged partial cross section of the cleat in FIGURE 1 more clearly showing the disposition of gasket and mastic material;

FIGURE 3 is a perspective view of another embodiment of cleat which may be used for joining air duct sections in the manner generally shown in FIGURE 1;

FIGURE 4 is a perspective view of the end of a section of the cleat of FIGURE 3 which has been cut to section length;

FIGURE 5 is a perspective view of still another embodiment of cleat usable for joining air duct sections as shown in FIGURE 1;

FIGURE 6 is a view of the cleat of FIGURE 5 in partially assembled or partially disassembled form; and FIGURE 7 is a cross section of a cleat such as shown in FIGURES 1 and 2, showing alignment of air duct edges for joining therewith and including added means for retaining the air duct edges together and within the cleat.

While illustrative embodiments of this invention will be described in detail herein with reference to the drawings, the invention is susceptible of embodiment in many different forms and it should be understood that the present disclosure is to be considered as an exemplification of the principles of the present invention and is not intended to limit the invention to the embodiments particularly described.

Referring to the drawings, as shown in FIGURES 1 and 2, a cleat 11 is in position joining the ends of two sections of galvanized metal duct work 12 and 13, e.g. between duct supports. Cleat 11 generally includes a structural member 14 formed from a strip of galvanized steel sheet metal. The structural member or sheet metal 14 is formed to provide first, second, and third sections which are spaced from and generally parallel to each other. These three sections are indicated by reference numerals 16, 17 and 18. Sections 16 and 17 are joined by a first joining portion 19 and sections 17 and 18 are joined by a second joining portion 20, each joining portion comprising a bend or fold in sheet metal 14. The edges of member 14 are turned out as at 21 and 22 for safety reasons to prevent sharp metal edges from cutting the user of the cleat. Such turned out portions permit the cleat to be reversible and may also provide structural strength to the cleat.

Disposed upon the facing surfaces of portions 16 through 18 is a mass of mastic indicated by reference numeral 23 and a soft rubber gasket 30 which is present particularly at the bends or interconnections 19 and 20. The mastic and gasket provide an airtight seal upon contact with the edge of duct work when the cleat is used for joining duct work sections. The mastic and gasket exemplify the elastomeric material usable in the structures and method of the present invention. The elastomeric material may take any form so long as it may be applied between the facing portions of the cleat structure 14 adjacent the joining portions or interconnections 19 and 20. Preferably the elastomeric material is temporally and thermally stable with respect to changes in viscosity or plasticity, stable with respect to such changes over an extended period of time and is fire-proof. The material may be of a color closely matching that of the galvanized metal of the cleat although black material is also acceptable and is more readily available. A particular such elastomeric material may be compounded so as to remain soft for three to six months in temperatures from −20° to 100° F., to be fire resistant by inclusion of fire retardant additives or by its very composition and may have an aluminum color in it closely matching the color of the galvanized metal. Advantageously, the elastomeric material may be a synthetic or natural rubber base composition such as an elastomer rubber sealer, elastomer neoprene sealer, elastomer resin sealer or the like. Wherever "rubber" is used herein, both synthetic and natural rubber are intended.

The cleat of FIGURE 3, i.e. cleat 24, is generally similar to that of FIGURES 1 and 2 for the purposes herein contemplated. As to the elastomeric material, cleat 24 uses the mastic 23 at junctures 19 and 20 and between sections 16, 17 and 18; in this form no gasket 30 is included.

The cleat may be formed from cleat stock such as a strip of sheet metal to the desired cleat configuration and during the forming of the cleat the elastomeric material is included. In the cleat of FIGURE 3, for example, sheet metal 25 is longitudinally folded almost to the configuration shown and the mastic 23 may then be injected, e.g. from a 1/8" head, along the bend; the forming operation is then completed by completing the longitudinal folds. The sheet metal 25 is preferably cold-formable.

Upon forming the cleat, the cleat material may be cut to size for sale in sections by a guillotine type cutting arm operation to provide cleat sections having closed ends as illustrated in FIGURE 4. In that the mastic material 23, which may be applied to the cleat surfaces either before or after forming the cleat, may be a semi-solid but fluid mastic substance which may tend to be squeezed from within the cleat structure during handling, the squeezing together of portions 16, 17 and 18 of the ends during cutting of cleat sections, providing such ends as shown in FIGURE 4, seals the ends of the cleat section and restricts the flow of material from the end of the cleat. The cleat sections may be produced in any desired lengths to provide cleat material for convenient handling.

Turning now to FIGURE 5, there is shown another embodiment of a cleat which is usable to join duct work sections in lieu of cleat 11 shown in FIGURE 1. The cleat 26 shown in FIGURE 5 comprises a structural body formed of sheet metal 27 and including the three opposing portions and two interconnecting portions as in the cleat of FIGURE 3. The cleat edges are turned at 28 to prevent them from cutting the user during use. Two additional leaves 29 are provided on either face of the finished cleat for improved rigidity.

Within each joining portion of the cleat structure of cleat 26, there is provided a resilient mass in the form of a rubber gasket 30 which is shown as an elongate rubber cylindrical member. Gasket 30 is normally cylindrical (FIGURE 6), i.e. of round cross section, but is shown in FIGURE 5 in compressed form between the opposing leaves or portions of cleat 26. The gasket is of a diameter slightly larger than the inner diameter of the joining portions of the cleat structure so that upon insertion of gaskets 30, as illustrated in FIGURE 6, and compression of leaves 29 toward each other to flatten the cleat, gaskets 30 will take an elliptical cross section form as shown in FIGURE 5.

A cross section of a cleat similar to that of FIGURES 1 and 2 is shown in FIGURE 7. The cleat 31 includes two upstanding portions 32 and 33, portion 32 being at the end of the uppermost leaf 16 and portion 33 being at the lateral junction of leaves 16 and 17. Each upstanding portion extends longitudinally of the cleat as depicted in FIGURE 1 and comprises a convolution capable of preventing or inhibiting longitudinal flexure of the cleat.

In FIGURE 7, cleat 31 is shown aligned with edges of ducts 12 and 13 for joining the edges. In use, edge 12 is inserted and forced home between leaves 16 and 17 and into deforming contact with elastomeric mass 30 adjacent bend 19. In like manner, the edge of duct 13 is inserted between leaves 17 and 18 and brought into contact with elastomeric mass 30. Prepunched or predrilled holes 37 may be provided through leaves 16, 17 and 18 of the cleat and holes 38 may be punched or drilled through ducts 12 and 13. Holes 37 are large enough to loosely receive a sheet metal screw (shown in phantom at 36) which may be force threaded through the smaller holes 38 to secure ducts 12 and 13 together. The cleat maintains the joint between ducts as an airtight connection.

Returning to FIGURE 1, it will be seen that the illustrated form of cleat is reversible and can conveniently be used at both top and bottom edges for joining duct work sections. In the duct work illustrated in FIGURE 1, the duct section 12 is supported by a strap or bracket member 40 secured by rivets, bolts or other suitable means at 41 to duct 12 and secured at its upper end, e.g. by screws 42, to an overhead support structure such as a ceiling, joist or the like, as illustrated at reference numeral 43. When installed, the cleat in essence provides a reinforcing channel in the form of the generally parallel members 32 and 33 and the interconnecting leaf between members 32 and 33. When the cleat is installed to join top edges of the duct work, the channel members upstand and supply rigidity to the cleat and joint; similarly, when the cleat is installed on the lower edges the channel members help support the cleat and joint. The structural strength and rigidity of the cleat is important during installation of duct work in that, during normal installation procedures, a section of duct work 12 is first supported from overhead by a bracket such as strap 40, the cleat is attached to the upper and lower edges of duct 12, and duct 13 is thereafter forced into the cleat to join the two ducts. During such joining operation, the cleats function as support members for the unsupported duct 13.

In FIGURE 7, a form of cleat is shown in which there are provided additional support members 45 for reinforcing or strengthening the upstanding members 32 and 33, thereby providing an even stronger channel configuration. Members 45 may be of sheet metal of the same thickness as the cleat and conform generally to the upper surface of portions 32 and 33. Members 45 may be normally closed along their exposed edges and may be placed over the portions 32 and 33 by opening the members 45 and snapping them on. When in position, the support members 45 and cleat portions 32 and 33 may be drilled or punched with suitable holes for receiving bolts and nuts illustrated at 46 for retaining the support members 45 in position. Such support members permit additional strengthening of the cleat without requiring higher upstanding members 32 and 33. The lower members 32 and 33, strengthened by the support members, can more readily be used for installations where head room is limited than can cleats with higher upstanding members 32 and 33.

I claim:

1. A joint for joining ends of separate air ducts, which joint comprises a first supported air duct having top and bottom walls with end edges; a second air duct having top and bottom walls with unsupported ends; first cleat means joining the end of the second duct top wall to the end of the first duct top wall; and second cleat means joining the end of the second duct bottom wall to the end of the first duct bottom wall; each of said cleat means being a reversible cleat and comprising: a first generally planar sheet-like cleat section having first and second surfaces and first and second edges, a second generally planar sheet-like cleat section having first and second surfaces and first and second edges, said second section being generally parallel to said first section and having its first surface closely facing the second surface of said first section, a third generally planar sheet-like cleat section having first and second edges, said third section being generally parallel to said first and second sections and having a surface closely facing the second surface of said second section, a first integral sheet portion defining an outwardly projecting integral rib along the first edge of said first section generally perpendicular to the first surface of said first section, a double-thickness integral sheet portion comprising an outwardly projecting integral extension of said first section from along the second edge of said first section, said extension being folded over upon itself and extending downward to a position below the second edge of said first section and enclosing the second edge of said first section and merging with the second edge of said second section, said extension being generally perpendicular to said first section, said rib and extension being spaced from each other and generally parallel to each other and defining an inverted channel together with said first cleat section, and a joining portion joining the first edge of said second cleat section with the first edge of said third cleat section, said joining portion comprising an integral sheet portion extending in an arc of about 180 degrees to define a fold merging with the first edges of the second and third cleat sections, said first and second and said second and third cleat sections closely facing each other to tightly receive the wall ends of opposite ones of said ducts, the first edge of said first section and first edge of said second section comprising a pair of lips defining a first elongated slit-like opening for insertion of the end wall of a duct, the second edge of said second section and a second edge of said third section comprising a pair of lips defining a second elongated slit-like opening; the top wall of said first duct having its end portion within said second opening and tightly between said second and third planar sections of the first cleat means, the top wall of said second duct having its end portion overlying the end portion of the first duct top wall and received within said first opening and tightly between said first and second planar sections of said first cleat means, said first duct having its bottom wall end within the first opening and tightly held between the first and second planar sections of said second cleat means, and said second duct having its bottom wall end portion overlying and overlapping the first duct bottom wall end portion and received within the second opening and tightly between said second and third planar sections of said second cleat means; and means impaling each of said cleats and the wall ends received thereby and holding the cleat sections with the wall ends tightly sandwiched therebetween.

2. The joint of claim 1 including a plurality of separate support members, one for each of said outwardly projecting extensions and ribs, snap-fitted over said extensions and ribs to cover said extensions and ribs and conforming generally with the outer surfaces of said extensions and ribs; and means securing said support members to said extensions and ribs.

3. A reversible cleat for joining ends of separate air ducts where each air duct has top and bottom walls, comprising: a first generally planar sheet-like cleat section having first and second surfaces and first and second edges, a second generally planar sheet-like cleat section having first and second surfaces and first and second edges, said second section being generally parallel to said first section and having its first surface closely facing the second surface of said first section, a third generally planar sheet-like cleat section having first and second edges, said third section being generally parallel to said first and second sections and having a surface closely facing the second surface of said second section, a first integral sheet portion defining an outwardly projecting first integral rib along the first edge of said first section generally perpendicular to the first surface of said first section, a second integral sheet portion comprising an outwardly projecting second integral rib of said first section along the second edge of said first section, said second rib extending and enclosing the second edge of said first section and merging with the second edge of said second section, said second rib being generally perpendicular to said first section, said ribs being spaced from each other and generally parallel to each other and defining an inverted channel together with said first cleat section, and a joining portion joining the first edge of said second cleat section with the first edge of said third cleat section, said joining portion comprising an integral sheet portion extending in an arc of about 180 degrees to define a fold merging the first edges of the second and third cleat sections, said first and second and said second and third cleat sections closely facing each other to tightly receive the wall ends of ducts to be joined, the first edge of said first section and first edge of said second section comprising a pair of lips defining a first elongated slit-like opening for insertion of the end wall of a duct, the second edge of said second section and a second edge of said third section comprising a pair of lips defining a second elongated slit-like opening; for insertion of the end wall of a duct, said cleat being reversible for joining top walls of ducts end-to-end and bottom walls of ducts end-to-end with said ribs always projecting exteriorly of the ducts in installations where only one duct end to be joined is supported with the top and bottom walls of the supported duct end underlying and overlapping the top and bottom walls respectively of an unsupported duct end whereby one of said ribs rigidifies the end of the unsupported duct in said installation regardless of whether the cleat joins top walls or bottom walls.

4. The cleat of claim 3 including a separate support member for each of said outwardly projecting ribs, snap-fitted over the rib and conforming generally with the outer surfaces of the rib, and means for securing said support members to said ribs.

5. The cleat of claim 3 including a first body of mastic between the first and second sections and a second body of mastic between said second and third sections, said bodies of mastic being formed concurrently with formation of the cleat.

References Cited by the Examiner
UNITED STATES PATENTS

| 565,499 | 8/1896 | Pattison | 285—424 X |
| 1,762,766 | 6/1930 | Garay | 285—331 |
| 1,935,690 | 11/1933 | Zack | 285—331 |
| 2,709,454 | 5/1955 | Coulters | 285—424 X |
| 2,761,209 | 9/1956 | Fisher | 29—509 |
| 2,778,100 | 1/1957 | Lipman | 29—509 |
| 2,951,613 | 9/1960 | Hardingg. | |

OTHER REFERENCES

Stiggleman: Heating, Piping & Air Conditioning, November 1959, p. 106–109.

CARL W. TOMLIN, *Primary Examiner.*